US008318508B2

(12) United States Patent
Mirkin et al.

(10) Patent No.: US 8,318,508 B2
(45) Date of Patent: Nov. 27, 2012

(54) PATTERNING WITH COMPOSITIONS COMPRISING LIPID

(75) Inventors: Chad A. Mirkin, Wilmette, IL (US); Ling Huang, Corning, NY (US); Rafael Vega, Evanston, IL (US); Steven Lenhert, Karlsruhe (DE)

(73) Assignees: Northwestern University, Evanston, IL (US); Karlsruhe Institute of Technology, Karlsruhe (DE)

( * ) Notice: Subject to any disclaimer, the term of this patent is extended or adjusted under 35 U.S.C. 154(b) by 294 days.

(21) Appl. No.: 12/213,301

(22) Filed: Jun. 17, 2008

(65) Prior Publication Data

US 2009/0143246 A1   Jun. 4, 2009

Related U.S. Application Data

(60) Provisional application No. 60/945,164, filed on Jun. 20, 2007, provisional application No. 60/929,314, filed on Jun. 21, 2007, provisional application No. 61/047,642, filed on Apr. 24, 2008.

(51) Int. Cl.
*G01N 1/00* (2006.01)

(52) U.S. Cl. .......................................... 436/180; 436/71

(58) Field of Classification Search .................. 436/180, 436/37, 71; 506/32
See application file for complete search history.

(56) References Cited

U.S. PATENT DOCUMENTS

| | | | |
|---|---|---|---|
| 4,626,501 A | 12/1986 | Landes | |
| 5,443,791 A | 8/1995 | Cathcart et al. | |
| 5,705,814 A | 1/1998 | Young et al. | |
| 5,965,721 A | 10/1999 | Cook et al. | |
| 5,981,733 A | 11/1999 | Gamble et al. | |
| 6,379,932 B1 | 4/2002 | Arnold et al. | |
| 6,410,231 B1 | 6/2002 | Arnold et al. | |
| 6,573,369 B2 | 6/2003 | Henderson et al. | |
| 6,635,311 B1 | 10/2003 | Mirkin et al. | |
| 6,642,129 B2 | 11/2003 | Liu et al. | |
| 6,787,313 B2 | 9/2004 | Morozov et al. | |
| 6,827,979 B2 | 12/2004 | Mirkin et al. | |
| 6,867,443 B2 | 3/2005 | Liu et al. | |
| 6,998,228 B2 | 2/2006 | Henderson et al. | |
| 7,005,378 B2 | 2/2006 | Crocker, Jr. et al. | |
| 7,008,769 B2 | 3/2006 | Henderson et al. | |
| 2002/0122873 A1 | 9/2002 | Mirkin et al. | |
| 2003/0005755 A1 | 1/2003 | Schwartz | |
| 2003/0007242 A1 | 1/2003 | Schwartz | |
| 2003/0068446 A1 | 4/2003 | Mirkin et al. | |
| 2003/0162004 A1 | 8/2003 | Mirkin et al. | |
| 2003/0185967 A1 | 10/2003 | Eby et al. | |
| 2004/0008330 A1 | 1/2004 | Mirkin et al. | |
| 2004/0026681 A1 | 2/2004 | Cruchon-Dupeyrat et al. | |
| 2004/0028804 A1 | 2/2004 | Anderson | |
| 2004/0101469 A1 | 5/2004 | Demers | |
| 2004/0175631 A1 | 9/2004 | Crocker et al. | |
| 2004/0185445 A1 | 9/2004 | Fang | |
| 2005/0009206 A1 | 1/2005 | Mirkin et al. | |
| 2005/0035983 A1 | 2/2005 | Cruchon-Dupeyrat et al. | |
| 2005/0235869 A1 | 10/2005 | Cruchon-Dupeyrat et al. | |
| 2005/0255237 A1 | 11/2005 | Zhang et al. | |
| 2006/0014001 A1 | 1/2006 | Zhang et al. | |
| 2006/0094053 A1* | 5/2006 | Stamou et al. ............. | 435/6 |
| 2006/0177585 A1 | 8/2006 | Takagi et al. | |
| 2006/0242740 A1 | 10/2006 | Collier et al. | |
| 2007/0065947 A1 | 3/2007 | Dong et al. | |
| 2007/0129321 A1 | 6/2007 | Mirkin et al. | |
| 2008/0020141 A1 | 1/2008 | Lenhert et al. | |
| 2008/0105042 A1 | 5/2008 | Mirkin et al. | |

FOREIGN PATENT DOCUMENTS

| | | |
|---|---|---|
| EP | 1 614 461 A | 1/2006 |
| WO | WO 99/05308 A | 2/1999 |
| WO | WO 03/048314 | 6/2003 |
| WO | WO 2004/010074 A2 | 1/2004 |
| WO | WO 2004/039487 A | 5/2004 |
| WO | WO 2006/035923 A | 4/2006 |
| WO | WO 2008/157550 A2 | 12/2008 |
| WO | WO 2009/035739 A2 | 3/2009 |

OTHER PUBLICATIONS

Lee, Ki-Bum, et al. "Protein nanoarray generated by dip-pen nanolithography." Science (Feb. 7, 2002) p. 1-3.*
Liu, Gang-Yu, et al. "Positioning protein molecules on surfaces: A nanoengineering approach to supramolecular chemistry." Proceedings of the National Academy of Science of the United States (2002) 99 p. 5165-5170.*
Orth, R. N., et al. "Creating biological membranes on the micron scale: Forming patterned lipid bilayers using a polymer lift-off technique." Biophysical Journal (2003) 85 p. 3066-3073.* Pujol, M., et al. "Influence of alkyl length in the miscibility of several types of lechithins. Interaction of doxorubicin with these membrane models." Thin Solid Films (1996) 284-285 p. 723-726.*
Vinogradova, Olga I., et al. "Dynamic effects on force measurements. 2. Lubrication and the atomic force microscope." Langmuir (2003) 19 p. 1227-1234.*
Edwards, Aled M. et al. "Two-dimensional protein crystals in aid of three-dimensional protein crystal growth." Methods in Enzymology (1997) 276 166-171.*
Garavito, R. Michael et al. "Detergents as tools in membrane biochemistry." Journal of Biological Chemistry (2001) 276 32403-32406.*
Lehnert, S., et al., "Massively parallel dip-pen nanolithography of heterogeneous supported phospholipid multilayer patterns", Small, vol. 3, No. 1, pp. 71-75 (2007).
PCT/US2008/007498, filed Jun. 17, 2008, International Search Report and Written Opinion, Dec. 9, 2008 (17 pages).
U.S. Appl. No. 12/140,793, filed Jun. 17, 2008, Mirkin et al.
U.S. Appl. No. 12/140,780, filed Jun. 17, 2008, Mirkin et al.
U.S. Appl. No. 11/690,738, filed Mar. 23, 2007, Mirkin et al.

(Continued)

*Primary Examiner* — Yelena G Gakh
*Assistant Examiner* — Christopher A Hixson
(74) *Attorney, Agent, or Firm* — Foley & Lardner LLP

(57) ABSTRACT

Better patterning methods, including for better methods for forming biomolecular arrays, including a method comprising: providing a tip and a substrate surface, disposing a patterning composition at the end of the tip, depositing at least some of the patterning composition from the tip to the substrate surface to form a deposit disposed on the substrate surface, wherein the patterning composition comprises at least one lipid, optionally at least one solvent, and at least one patterning species different from the lipid and the optional solvent. The lipid can be a phospholipid such as DOPC. The patterning species can be an oligonucleotide or a protein. Microarrays and nanoarrays can be prepared including nanoscale resolution of deposits. The lipid can activate patterning or increase the rate of patterning. Simplified tip preparation can be achieved. Nanoscopic, SPM, and AFM tips can be used.

61 Claims, 4 Drawing Sheets (4 of 4 Drawing Sheet(s) Filed in Color)

OTHER PUBLICATIONS

Ginger et al., "the Evolution of Dip-Pen Nanolithography", Angew. Chem. Int. Ed. 2004, vol. 43, pp. 30-45.

Pique et al., "Direct-Write Technologies for Rapid Prototyping Applications: Sensors, Electronics, and Integrated Power Sources", Academic Press, 2002.

Lawrence A. Bottomley, :Scanning Probe Microscopy, Anal. Chem., 1998, vol. 70, pp. 425R-475R.

Robert Bohinski, "Lipids and Biomembrances", Modem Concepts in Biochemistry, 4th Ed., 1983, Chapter 8.

Morrison et al., "Lipids, Fats and Steroids", Organic Chemistry $6^{th}$ Ed., Prentice Hall, 1994, Chapter 33.

Alberts et al., "Small Molecules, Energy, and Biosynthesis", Molecular Biology of The Cell $3^{rd}$ Ed., 1994, Chapter 2.

Alan Fersht, Enzyme Structure and Mechanism, $2^{nd}$ Ed., 1977, Chapter 15.

Albert Lehninger, "Proteins and Their Biological Functions: A Survey", Biochemistry, 1970, Chapter 3, pp. 55-66.

Calladine et al., Understanding DNA, The Molecule & How it Works, $2^{nd}$ Ed., Academic Press, 1997.

Piner et al., "Dip-Pen Nanolithography", Science, 1999, vol. 283, pp. 661-663.

Rosi et al., "Nanostructures in Biodiagnostic", Chem. Rev. 2005, vol. 105, pp. 1547-1562.

Lenhert et al., "Massively Parallel Dip-Pen Nanolithography of Heterogeneous Supported Phospholipid Multilayer Patterns", small, 2007, vol. 3(1), pp. 71-75.

G. Marc Loudon, "Chemistry of Carboxylic Acid Derivatives", Organic Chemistry, $3^{rd}$ Ed., Garland Publishing, Chapter 21.

Muller et al., "Microarray Technology and its Applications", Springer, 2005.

PCT/US2008/067234, filed Jun. 17, 2008, International Search Report and Written Opinion (May 29, 2009)(14 pages).

U.S. Appl. No. 12/000,456, filed Dec. 12, 2007, Mirkin.

* cited by examiner

PATTERNING WITH COMPOSITIONS COMPRISING LIPID

RELATED APPLICATIONS

This application claims priority to U.S. provisional Ser. No. 60/945,164 filed Jun. 20, 2007, and also to U.S. provisional Ser. No. 60/929,314 filed Jun. 21, 2007, and also to U.S. provisional Ser. No. 61/047,642 filed Apr. 24, 2008, all of which are hereby incorporated by reference in their entireties.

FEDERAL FUNDING STATEMENT

Various embodiments described herein were funded by the federal government under the following grants: Air Force Office Scientific Research (AFOSR grant: AFOSR FA9550-05-1-0054) and AFMCLO/JAZI (grant #FA8650-06-C-7617). The government has certain rights in the invention.

BACKGROUND

References are cited hereinafter in a reference listing.

Microarrays and nanoarrays are important commercial developments. Patterned arrays of molecules and in particular biomolecules and biological species, such as oligonucleotides, proteins, virus particles, and cells (eukaryotic and prokaryotic), have been utilized as powerful tools in a variety of biological and interdisciplinary studies. For example, microarrays, in particular, have led to significant advances in many areas of biological and medical research (1). With the advent of powerful new nanolithographic methods, such as dip-pen nanolithography (DPN) printing or patterning (2), there is now the ability for reducing the feature size in such arrays to their physical limit, the size of the structures from which they are made of and the size of the structures they are intended to interrogate (3). Such massive miniaturization not only allows one to increase the density of combinatorial libraries, increase the sensitivity of such structures in the context of a biodiagnostic event, and reduce the required sample analyte volume, but also allows one to carryout studies not possible with the more conventional microarray format.

In order to realize the full potential, including commercial potential, of microarrays and nanoarrays, including biological arrays, the direct deposition of species, molecules, biomolecules using nanolithograhpic techniques (e.g. DPN printing) needs to be as routine and robust as possible. Currently, some applications of DPN printing can be limited to the use of the single component arrays, of either a single oligonucleotide sequence or a given protein. Other applications are not so limited. The ability to make multi-component arrays is dependant on the ability to directly deposit multiple biological molecules simultaneously through DPN printing. Previous advances in this area have been made, but needs yet exist, particularly for commercial applications. One potential limitation is the chemical modification of a tip such as an AFM tip for reproducible tip coating. Different biomolecules may require a specific modification, which can lead to compatibility issues. The second is in the context of parallel DPN printing. Biological molecules can have different transport properties, which can lead to heterogeneous surface features from tip-to-tip, and in some cases, cannot be deposited at all. Finally, denaturation and loss of biological activity can be an issue. In order to bypass these potential limitations, a method that can equalize the transport rates while still preserving the biological activity of the molecules is desirable.

SUMMARY

Embodiments provided herein include for example methods of making, articles, devices, compositions, and methods of using.

For example, one embodiment provides a method comprising: providing a tip and a substrate surface, disposing a patterning composition at the end of the tip, depositing at least some of the patterning composition from the tip to the substrate surface to form a deposit disposed on the substrate surface, wherein the patterning composition comprises at least one lipid, optionally at least one solvent, and at least one patterning species different from the lipid and the optional solvent.

Another embodiment provides a method comprising: providing a nanoscopic tip and a substrate surface, disposing a patterning composition at the end of the nanoscopic tip, depositing at least some of the patterning composition from the tip to the substrate surface to form a deposit disposed on the substrate surface, wherein the patterning composition comprises at least one phospholipid, optionally at least one solvent, and at least one biooligomeric or biopolymeric patterning species different from the lipid and the optional solvent.

One other embodiment is a method comprising: providing a tip and a substrate surface, disposing a patterning composition at the end of the tip, depositing at least some of the patterning composition from the tip to the substrate surface to form a deposit disposed on the substrate surface, wherein the patterning composition comprises at least one lipid, optionally at least one solvent, and at least one patterning species different from the lipid and the optional solvent, and wherein the lipid activates or increases the rate of deposition of the patterning species.

An additional embodiment comprises a method comprising: providing an atomic force microscope tip and a substrate surface, disposing a patterning composition at the end of the atomic force microscope tip, depositing at least some of the patterning composition from the tip to the substrate surface to form a deposit disposed on the substrate surface, wherein the patterning composition comprises at least one phospholipid and at least one biopolymer different from the phospholipid.

An additional embodiment provides an array comprising: a substrate surface, at least one deposit comprising a patterning composition disposed on the surface, wherein the patterning composition comprises at least one lipid, optionally at least one solvent, and at least one patterning species different from the lipid and the optional solvent.

An additional embodiment provides a method for using a lipid comprising: co-mixing the lipid with a patterning composition comprising a patterning species different than the lipid to promote patterning of the patterning species when disposed on the end of a tip and deposited onto a substrate surface.

For one or more embodiments described herein, advantages can include, for example, improved deposition including ability to deposit molecules that otherwise would not be able to deposit, improve the rate of deposition, better control of deposition including control of pattern size, improve the consistency of deposition from molecule to molecule when multiple deposition is done at once, ability to use tips without modification, and retention of biological activity in the deposited molecule, among other advantages.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Introduction

Figure 1:
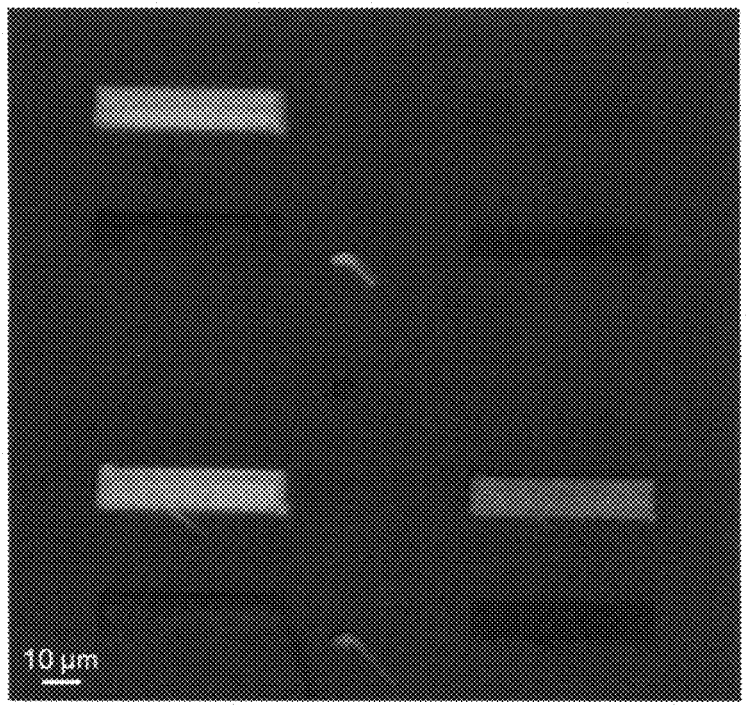
FIG. 1: Deposition of fluorophore-labeled thiolated DNA onto a gold surface through the use of a phospholipid matrix. Fluorescence overlay of bright-field, red, green fluorescence (grey, red, and green; respective false colors).

All references cited herein are hereby incorporated by reference in their entirety.

Priority U.S. provisional Ser. No. 60/945,164 filed Jun. 20, 2007, and also priority U.S. provisional Ser. No. 60/929,314 filed Jun. 21, 2007, and also priority U.S. provisional Ser. No. 61/047,642 filed Apr. 24, 2008, are all hereby incorporated by reference in their entireties, including claims, figures, working examples, and additional descriptive embodiments.

U.S. application Ser. No. 12/140,780 to Mirkin et al., "Matrix Assisted Ink Transport" filed Jun. 17, 2008, the same day as this application, is incorporated by reference in its entirety, including figures, working examples, claims, and additional descriptive embodiments.

U.S. application Ser. No. 12/140,793 to Mirkin et al., "Universal Matrix" filed Jun. 17 2008, the same day as this application, is incorporated by reference in its entirety, including figures, working examples, claims, and additional descriptive embodiments.

Herein, a variety of novel approaches are demonstrated. In one embodiment, a lipid is utilized, such as for example one or more phospholipids, as a universal ink carrier. For example, the lipid can function as a bio-compatible ink carrier to directly pattern a variety of molecules and species, including biological molecules (e.g., oligonucleotides and proteins) onto a surface with dip-pen nanolithography (DPN) printing. The use of phospholipids as a preferred ink carrier is desirable because this technique can afford a convenient biocompatible environment that can preserve the structure and integrity of the biomolecules being delivered. When using the preferred phospholipids as a universal ink carrier, surface modification of the AFM tips prior to DPN printing can be carried out if helpful but may not be required. Furthermore, the rate of deposition of the embedded biomolecules can be dominated by the transport rate of the phospholipid matrix. This allows for the simultaneous deposition of different biomolecules, at a controllable rate, using parallel DPN printing. One can also apply this approach for the delivery of biological molecules that are more difficult to pattern.

DPN printing is generally known in the art including instrumentation, materials, and methods. For practice of the various embodiments described herein, lithography, microlithography, and nanolithography instruments, pen arrays, active pens, passive pens, inks, patterning compounds, kits, ink delivery, software, and accessories for direct-write printing and patterning can be obtained from NanoInk, Inc., Chicago, Ill. Software includes INKCAD software (NanoInk, Chicago, Ill.), providing user interface for lithography design and control. E-Chamber can be used for environmental control. Dip Pen Nanolithography™ and DPN™ are trademarks of NanoInk, Inc.

The following patents and co-pending applications related to direct-write printing with use of cantilevers, tips, and patterning compounds are hereby incorporated by reference in their entirety and can be used in the practice of the various embodiments described herein, including inks, patterning compounds, software, ink delivery devices, and the like:

1. U.S. Pat. No. 6,635,311 to Mirkin et al., which describes fundamental aspects of DPN printing including inks, tips, substrates, and other instrumentation parameters and patterning methods;
2. U.S. Pat. No. 6,827,979 to Mirkin et al., which further describes fundamental aspects of DPN printing including software control, etching procedures, nanoplotters, and complex and combinatorial array formation.
3. U.S. patent publication number 2002/0122873 A1 published Sep. 5, 2002 ("Nanolithography Methods and Products Produced Therefor and Produced Thereby"), which describes aperture embodiments and driving force embodiments of DPN printing.
4. U.S. patent application Ser. No. 10/366,717 to Eby et al., filed Feb. 14, 2003 ("Methods and Apparatus for Aligning Patterns on a Substrate"), which describes alignment methods for DPN printing (published Oct. 2, 2003 as 2003/0185967).
5. U.S. patent application Ser. No. 10/375,060 to Dupeyrat et al., filed Feb. 28, 2003 ("Nanolithographic Calibration Methods"), which describes calibration methods for DPN printing.
6. U.S. Patent Publication 2003/0068446, published Apr. 10, 2003 to Mirkin et al. ("Protein and Peptide Nanoarrays"), which describes nanoarrays of proteins and peptides;
7. U.S. patent application Ser. No. 10/307,515 filed Dec. 2, 2002 to Mirkin et al. ("Direct-Write Nanolithographic Deposition of Nucleic Acids from Nanoscopic Tips"), which describes nucleic acid patterning (PCT/US2002/038252 published Jun. 12, 2003).
8. U.S. patent application Ser. No. 10/320,721 filed Dec. 17, 2002 to Mirkin et al. ("Patterning of Solid State Features by Direct-Write Nanolithographic Printing"), which describes reactive patterning and sol gel inks (now published Aug. 28, 2003 as 2003/0162004).
9. U.S. Pat. Nos. 6,642,129 and 6,867,443 to Liu et al. ("Parallel, Individually Addressable Probes for Nanolithography"), describing active pen arrays.
10. U.S. Patent Publication 2003/0007242, published Jan. 9, 2003 to Schwartz ("Enhanced Scanning Probe Microscope and Nanolithographic Methods Using Same").
11. U.S. Patent Publication 2003/0005755, published Jan. 9, 2003 to Schwartz ("Enhanced Scanning Probe Microscope").

12. U.S. patent application Ser. No. 10/637,641 filed Aug. 11, 2003, now published as 2004/0101469, describing catalyst nanostructures and carbon nanotube applications.
13. U.S. patent application Ser. No. 10/444,061 filed May 23, 2003, now published as 2004/0026681 published Feb. 12, 2004, and US patent publication 2004/0008330 published Jan. 15, 2004, describing printing of proteins and conducting polymers respectively.
14. U.S. patent application Ser. No. 10/647,430 filed Aug. 26, 2003, now U.S. Pat. No. 7,005,378, describing conductive materials as patterning compounds.
15. U.S. patent application Ser. No. 10/689,547 filed Oct. 21, 2003, now published as 2004/0175631 on Sep. 9, 2004, describing mask applications including photomask repair.
16. U.S. patent application Ser. No. 10/705,776 filed Nov. 12, 2003, now published as 2005/0035983 on Feb. 17, 2005, describing microfluidics and ink delivery.
17. U.S. patent application Ser. No. 10/788,414 filed Mar. 1, 2004, now published as 2005/0009206 on Jan. 13, 2005 describing printing of peptides and proteins.
18. U.S. patent application Ser. No. 10/893,543 filed Jul. 19, 2004, now published as 2005/0272885 on Dec. 8, 2005, describing ROMP methods and combinatorial arrays.
19. U.S. patent application Ser. No. 11/056,391 filed Feb. 14, 2005, now published as 2005/0255237 published on Nov. 17, 2005, describing stamp tip or polymer coated tip applications.
20. U.S. patent application Ser. No. 11/065,694 filed Feb. 25, 2005, now published as 2005/0235869 on Oct. 27, 2005, describing tipless cantilevers and flat panel display applications.
21. US Patent publication 2006/001,4001 published Jan. 19, 2006 describing etching of nanostructures made by DPN methods.
22. WO 2004/105046 to Liu & Mirkin published Dec. 2, 2004 describes scanning probes for contact printing
23. US Patent Publication 2007/0129321 to Mirkin describing virus arrays.

All references cited in 1-23 above are incorporated by reference and the teachings therein can be adapted for use with the various embodiments described herein.

DPN methods are also described in Ginger et al., "The Evolution of Dip-Pen Nanolithography," *Angew. Chem. Int. Ed.* 2004, 43, 30-45, including description of high-throughput parallel methods.

Direct write methods, including DPN printing and pattern transfer methods, are described in for example *Direct-Write Technologies, Sensors, Electronics, and Integrated Power Sources*, Pique and Chrisey (Eds), 2002.

Two dimensional arrays for nanolithography are described in, for example, US patent publication 2008/0105042 to Mirkin et al, filed Mar. 23, 2007, which is hereby incorporated by reference in its entirety including working examples, figures, claims, and additional descriptive embodiments.

The direct-write nanolithography instruments and methods described herein are particularly of interest for use in preparing bioarrays, nanoarrays, and microarrays based on peptides, proteins, nucleic acids, DNA, RNA, viruses, biomolecules, and the like. See, for example, U.S. Pat. No. 6,787,313 for mass fabrication of chips and libraries; U.S. Pat. No. 5,443,791 for automated molecular biology laboratory with pipette tips; U.S. Pat. No. 5,981,733 for apparatus for the automated synthesis of molecular arrays in pharmaceutical applications. Combinatorial arrays can be prepared. See also, for example, U.S. Pat. Nos. 7,008,769; 6,573,369; and 6,998,228 to Henderson et al.

Scanning probe microscopy is reviewed in Bottomley, *Anal. Chem.*, 1998, 70, 425R-475R. Also, scanning probe microscopes are known in the art including probe exchange mechanisms as described in, for example, U.S. Pat. No. 5,705,814 (Digital Instruments).

Patterning compositions can be formulated and adapted for transfer and deposition from the tip to a substrate surface. The compositions can comprise two or components including one or more lipids and one or more patterning species. An optional solvent system can be also used, and the amount of solvent can be varied by use of for example drying steps or humid atmosphere. The patterning composition can be formulated to exclude components and amounts of components which would interfere with the deposition process, wherein the patterning composition consists essentially of the ingredients needed to carry out a successful result. Patterning compositions can be dried, partially or fully, on the tip before the deposition step.

If desired, surfactants can be used. See for example US Patent Publication No. 2006/0242740 to Collier et al., which is hereby incorporated by reference in its entirety.

PATTERNING COMPOSITION—LIPID

The patterning composition can comprise one or more lipids, and lipids are generally known in the art. See for example, Bohinski, *Modern Concepts in Biochemistry*, 4$^{th}$ Ed., Chapter 8, "Lipids and Biomembranes." For example, lipids can be simple lipids, compound lipids, or derived lipids. Simple lipids can be for example acylglycerols or waxes. Compound lipids can be for example phsphoacylglycerols, sphingomyelins, cerebrosides, or gangliosides. Derived lipids can be for example steroids, carotenoids, or lipid vitamins.

For lipids known in the art, see also, for example, chapter 33, as well as the entire textbook of *Organic Chemistry* 6$^{th}$ ed., Morrison and Boyd, Prentice hall, Englewood cliffs, N.J. 1992; chapter 2, as well as the entire textbook of *Molecular biology of the cell* 3$^{rd}$ ed., Alberts et al., Garland publishing, New York, N.Y., 1994; and chapter 21, as well as the entire textbook of *Organic Chemistry* 3$^{rd}$ ed., Loudon, the Benjamin/Cummings publishing co., Redwood city Calif., 1995.

Lipids can be used which are natural or synthetic. The lipid can be able to form liposomes in aqueous solution, either on its own or in combination with other lipids.

Lipids can be compounds comprising long hydrocarbon chains which can result in them being insoluble in water but soluble in nonpolar organic solvents.

Additional examples of lipids include fats, oils, steroid and waxes.

Glycerides are one type of lipids which are formed from glycerol and fatty acids. Glycerol comprises three hydroxyl groups which upon esterification with one, two or three fatty acids forms monoglycerides, diglycerides and triglycerides respectively. If one of the fatty acids is replaced with a sugar or a phosphate the resulting compound is a glycolipid or a phospholipid respectively. The fatty acids can be unsaturated, saturated, monounsaturated or polyunsaturated. Examples of unsaturated fatty acids includes, oleic, linoleic, linolenic and arachidonic acid. Examples of saturated fatty acids includes, myristic, palmitic and stearic acids. Further, the fatty acids may adopt a cis or trans configuration. The length of the fatty acid chain may vary. For example, the fatty acid hydrocarbon chain may comprise more than 3 carbon atoms, between 3-18 atoms or between 12-20 carbon atoms. The chain may or may not be branched. In one embodiment, the lipid compound comprises a phosphate group. In another embodiment, the lipid compound comprises a sugar group. In one embodiment, the lipid compound comprises one, two or three fatty acids. In a further embodiment, the lipid compound comprises at least one fatty acid which is saturated, monounsaturated or polyunsaturated. The lipid can comprise two fatty acids. At least one fatty acid can be monounsaturated. Both fatty acids can be monounsaturated. The fatty acid may be cis or trans. In one embodiment, at least one fatty acid comprises at least 3 carbon atoms. In another embodiment, at least one fatty acid comprises between 3 and 18 carbon atoms, including all integers in between. In another embodiment, at least one fatty acid comprises between 12 and 20 carbon atoms including all integers in between.

In one embodiment the lipid compound is a phospholipid comprising an amino group. The amino group may be primary, secondary, tertiary or quaternary. Preferably the amino group is quaternary. More preferably the amino group can be bonded to an oxygen atom of the phosphate group. Most preferably the amino group can be bonded to the oxygen atom through at least one carbon atom.

In another embodiment, the lipid compound comprises a phospholipid derivative. Non limiting examples include phophacholine, phosphoglycerol, phosphatidic acid, phosphoserine, PEG phospholipid, and the like.

The lipid can exhibit a gel-liquid crystal transition temperature.

The molecular weight of the lipid can be for example 250 to about 2,000, or about 500 to about 1,500, or about 500 to about 1,000.

In one embodiment, lipids can be used which can self assemble into membranes including lipid bilayers, so that the lipid is a lipid capable of self-assembling into a lipid bilayer. See for example US Patent Publication No. 2006/0094053 regarding lipid bilayers.

In another embodiment, the lipid can be represented by the structure of formula I wherein, for example, $R_1$ and $R_2$ are independently selected, each representing a saturated, monosaturated, unsaturated, or polysaturated carbon chain with 3-20 carbon atoms.

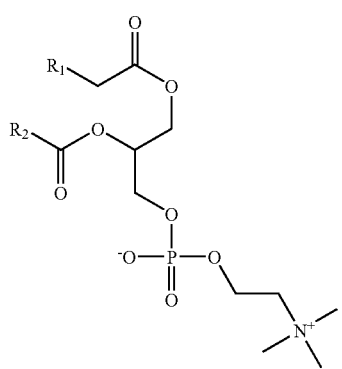

(I)

One example of a lipid is DOPC as described further below in the working examples. Other examples include POPC and DMPC. See for example Lenhart et al., *Small*, 2007, 3, no. 1, 71-75 for lipids which can be patterned.

PATTERNING COMPOSITION—PATTERNING SPECIES

The patterning composition can comprise one or more patterning species. This is a different component than the lipid. The patterning species can be molecular or particulate. It can be synthetic or natural. It can be polymeric, oligomeric, or non-polymeric. It can be a small molecule. Biomolecular applications are particular of note. For example, the patterning species can be a biomolecule (wherein water is not a biomolecule). The patterning species can be a biopolymer. The patterning species can comprise polymerized or repeating units of nucleic acid or amino acid units. Patterning species can be for example oligonucleotides, DNA, RNA, protein, peptide, sugar, carbohydrate, and the like. The patterning species can be used so it is not adapted synthetically for interaction with a substrate surface. For example, it can be a natural species such as for example a natural protein. Alternatively, the patterning species can be used so it is adapted synthetically for interaction with a substrate surface. For example, an end group can be functionalized to bond to the surface. This can be represented by, for example, R—X or R—(X)$_n$, wherein R is a patterning species which has been functionalized with group X, and n is the number of groups X which can be for example 1-10, or 1-5, or 1-3.

Non-biological compounds which can serve as patterning species include for example particulate materials, nanostructured materials, organic compounds, inorganic compounds, polymers, synthetic polymers, compounds which chemisorb to metals (e.g., gold) such as thiols and sulfides, and the like.

Protein Patterning Species

The patterning species can comprise proteinaceous material and proteins and peptides. Proteinaceous materials include for example antibodies, enzymes, and the like. In the peptide and protein embodiments, the nanoarrays can be prepared comprising various kinds of chemical structures comprising peptide bonds. These include peptides, proteins, oligopeptides, and polypeptides, be they simple or complex. The peptide unit can be in combination with non-peptide units. The protein or peptide can contain a single polypeptide chain or multiple polypeptide chains. Higher molecular weight peptides are preferred in general although lower molecular weight peptides including oligopeptides can be used. The number of peptide bonds in the peptide can be, for example, at least three, ten or less, at least 100, about 100 to about 300, or at least 500.

Proteins are particularly preferred. The protein can be simple or conjugated. Examples of conjugated proteins include, but are not limited to, nucleoproteins, lipoproteins, phosphoproteins, metalloproteins and glycoproteins.

Proteins can be functional when they coexist in a complex with other proteins, polypeptides or peptides. The protein can be a virus, which can be complexes of proteins and nucleic acids, be they of the DNA or RNA types. The protein can be a shell to larger structures such as spheres and rod structures.

Proteins can be globular or fibrous in conformation. The latter are generally tough materials that are typically insoluble in water. They can comprise a polypeptide chain or chains arranged in parallel as in, for example, a fiber. Examples include collagen and elastin. Globular proteins are polypeptides that are tightly folded into spherical or globular shapes and are mostly soluble in aqueous systems. Many enzymes, for instance, are globular proteins, as are antibodies, some hormones and transport proteins, like serum albumin and hemoglobin.

Proteins can be used which have both fibrous and globular properties, like myosin and fibrinogen, which are tough, rod-like structures but are soluble. The proteins can possess more than one polypeptide chain, and can be oligomeric proteins, their individual components being called protomers. The oligomeric proteins usually contain an even number of polypeptide chains, not normally covalently linked to one another. Hemoglobin is an example of an oligomeric protein.

Types of proteins that can be incorporated include, but are not limited to, enzymes, storage proteins, transport proteins, contractile proteins, protective proteins, toxins, hormones and structural proteins.

Examples of enzymes include, but are not limited to ribonucleases, cytochrome c, lysozymes, proteases, kinases, polymerases, exonucleases and endonucleases. Enzymes and their binding mechanisms are disclosed, for example, in *Enzyme Structure and Mechanism, 2$^{nd}$ Ed.*, by Alan Fersht, 1977 including in Chapter 15 the following enzyme types: dehydrogenases, proteases, ribonucleases, staphyloccal nucleases, lysozymes, carbonic anhydrases, and triosephosphate isomerase.

Examples of storage proteins include, but are not limited to ovalbumin, casein, ferritin, gliadin, and zein.

Examples of transport proteins include, but are not limited to hemoglobin, hemocyanin, myoglobin, serum albumin, β1-lipoprotein, iron-binding globulin, ceruloplasmin.

Examples of contractile proteins include, but are not limited to myosin, actin, dynein.

Examples of protective proteins include, but are not limited to antibodies, complement proteins, fibrinogen and thrombin.

Examples of toxins include, but are not limited to, *Clostridium botulinum* toxin, diptheria toxin, snake venoms and ricin.

Examples of hormones include, but are not limited to, insulin, adrenocorticotrophic hormone and insulin-like growth hormone, and growth hormone.

Examples of structural proteins include, but are not limited to, viral-coat proteins, glycoproteins, membrane-structure proteins, α-keratin, sclerotin, fibroin, collagen, elastin and mucoproteins.

Natural or synthetic peptides and proteins can be used. Proteins can be used, for example, which are prepared by recombinant methods.

Examples of preferred proteins include immunoglobulins, IgG (rabbit, human, mouse, and the like), Protein A/G, fibrinogen, fibronectin, lysozymes, streptavidin, avdin, ferritin, lectin (Con. A), and BSA. Rabbit IgG and rabbit anti-IgG, bound in sandwich configuration to IgG are useful examples.

Spliceosomes and ribozomes and the like can be used.

A wide variety of proteins are known to those of skill in the art and can be used. See, for instance, Chapter 3, *"Proteins and their Biological Functions: A Survey,"* at pages 55-66 of BIOCHEMISTRY by A. L. Lehninger, 1970, which is incorporated herein by reference.

Additional proteins are described below in the working examples including labeled proteins and fluorescently labeled proteins. Proteins can include cholera toxin subunit B and trypsin inhibitor.

Nucleic Acid Patterning Species

In nucleic acid embodiments, the nucleic acid is not particularly limited. For example, the nucleic acid can be synthetically made, modified to include, for example, functional groups tailored for chemisorption or covalent bonding to the substrate, as well as naturally occurring. It can be of low, medium, or high molecular weight, oligomeric or polymeric. It can be single-, double-, or even triple-stranded. The nucleic acid can be based on deoxyribonucleic acid (DNA), ribonucleic acid (RNA), or combinations thereof. The structure of nucleic acids is generally described in, for example, Calladine and Drew, *Understanding DNA, The Molecule and How it Works, 2$^{nd}$ Ed.*, 1997.

General types of nucleic acid which can be patterned include, for example, DNA, RNA, PNA, CNA, RNA, HNA, p-RNA, oligonucleotides, oligonucleotides of DNA, oligonucleotides of RNA, primers, A-DNA, B-DNA, Z-DNA, polynucleotides of DNA, polynucleotides of RNA, T-junctions of nucleic acids, domains of non-nucleic acid polymer-nucleic acid block copolymers and combinations thereof. Additional general types of nucleic acids include, for example, viral RNA or DNA, a gene associated with a disease, bacterial DNA, fungal DNA, nucleic acid from a biological source, nucleic acid which is a product of a polymerase chain reaction amplification, nucleic acid contacted with nanoparticles, and nucleic acid double-stranded and hybridized with the oligonucleotides on the nanoparticles resulting in the production of a triple-stranded complex.

In general, the nucleic acid can be any of a group of organic substances found in cells and viruses that play a central role in the storage and replication of hereditary information and in the expression of this information through protein synthesis. Purines, pyrimidines, carbohydrates, and phosphoric acid generally characterize the fundamental organic substances of a nucleic acid. Purines and pyrimidines are nucleotides, a nucleoside in which the primary hydroxy group of either 2-deoxy-D-ribose or of D-ribose is esterified by orthophosphoric acid. A nucleoside is a compound in which a purine or pyrimidine base is bound via a N-atom to C-1 replacing the hydroxy group of either 2-deoxy-D-ribose or of D-ribose, but without any phosphate groups. The common nucleosides in biological systems are adenosine, guanosine, cytidine, and uridine (which contain ribose) and deoxyadenosine, deoxyguanosine, deoxycytidine and thymidine (which contain deoxyribose). Thus, a purine base may be an adenine nucleotide or a guanine nucleotide. A pyrimidine base may be thymine nucleotide, a cytosine nucleotide, or a uracil nucleotide.

The sequence of a nucleic acid may be random or specific so as to encode a desired amino acid structure. For instance, a group of three nucleotides may comprise a codon. One codon comprises an amino acid. The coding region of a nucleic acid comprises codons.

The nucleic acid can exist freely, or can be bound to peptides or proteins to form nucleoproteins in discreet bundles or structured forms such as, for example, chromosomes. A nucleic acid also can exist in single-stranded or double-stranded forms. A nucleic acid may also be linear, circular, or supercoiled. Nucleic acid may be isolated directly from a cell or organelle. A plasmid or cloning vector are also examples of nucleic acids.

The nucleic acid can be made up of nucleotides, each containing a carbohydrate sugar (deoxyribose), a phosphate group, and mixtures of nitrogenous purine- and pyrimidine-bases. The sugar may be of a cyclic or acyclic form. DNA comprises only thymine and cytosine pyrimidines and no uracil. DNA may be isolated from a cell as genomic, nuclear, or mitochondrial DNA, or made synthetically, i.e., by chemical processes.

A gene present in a cell typically comprises genomic DNA made up of exonic and intronic stretches of DNA. The exonic stretches comprises nucleotides that comprise codons that encode amino acids, whereas the intronic stretches of DNA comprise nucleotides that likely do not comprise codons that encode amino acids. The nucleotide sequence of purines and pyrimidines determine the sequences of amino acids in the polypeptide chain of the protein specified by that gene.

DNA may also be isolated as complementary or copy DNA (cDNA) produced from an RNA template by the action of RNA-dependent DNA polymerase. For example, the cDNA can be about 100-800mer strands from PCR amplification. If the RNA template has been processed to remove introns, the cDNA will not be identical to the gene from which the RNA was transcribed. Thus, cDNA may comprise a stretch of nucleotides that are largely exonic in nature.

When in double-stranded form, the two DNA strands form a double helix. In this helix, each nucleotide in one strand is hydrogen bonded to a specific nucleotide on the other strand. Thus, in DNA, adenine bonds with thymine and guanine bonds with cytosine. The ability of nucleotides present in each strand to bind to each other determines that the strands will be complementary, e.g., that for every adenine on one strand there will be a thymine on the other strand.

RNA can be generally similar to DNA, but contains the sugar ribose instead of deoxyribose and the base uracil instead of thymine. RNA can be single-stranded or double-stranded and is transcribed from a cell's DNA. An RNA molecule may form a hairpin loop or other double-stranded structures. RNA may be template RNA, messenger RNA (mRNA), total RNA, or transfer RNA (tRNA). polysome. RNA-DNA hybrid molecules can be deposited according to the present invention. Furthermore, protein-nucleic acids, or "peptide nucleic acids" ("PNA") also may be used in accordance with the present invention.

The binding properties exhibited between complementary nucleotides makes nucleic acids useful as probes that can bind to other nucleic acids. Nucleic acids can be labelled and used as probes. By any one of a number of standard labelling techniques, nucleic acid probes can be used to detect, by hybridization, another nucleic acid. That hybridization can be visualized or detected if the label is, for example, a fluorescent, radioactive, or enzymatic label. Thus, a nucleic acid of the present invention also can be labelled, or modified so as to comprise a detectable entity, like a fluorescent marker or tag, a gold particle, streptavidin, digoxigenin, a magnetic bead, or other markers known to the skilled artisan. See, for example, U.S. Pat. No. 4,626,501 ("Labeled DNA") to Landes, which is hereby incorporated by reference.

Nucleotides and nucleic acids also can be modified so that it is protected against nucleic acid degradation. For instance, a nucleic acid may be encapsulated within a liposome. Alternatively, a thiol group may be incorporated into a polynucleotide, such as into an RNA or DNA molecule, by replacing the phosphorous group of the nucleotide. When so incorporated into the "backbone" of a nucleic acid, a thiol can prevent cleavage of the DNA at that site and, thus, improve the stability of the nucleic acid molecule.

U.S. Pat. No. 5,965,721 to Cook et al. is also incorporated by reference, disclosing oligonucleotides which can be patterned and can have improved nuclease resistance and improved cellular uptake.

Thus, the bioavailability of a nucleic acid treatment in vivo may be improved by modifying the nucleic acid as described. For instance, a modified nucleic acid formulation may have an increased half-life and/or be retained in plasma for longer periods of time than non-modified nucleic acids. A formulation of nucleic acid and polyethylene glycol, for instance, may also increase the half-life of the nucleic acid in vivo, as could any known slow-release nucleic acid formulation. Thus, modifying a nucleic acid may increase the effectiveness of the nucleic acid in vivo and/or its bioavailability.

The size of a nucleic acid can range considerably, from the size of a few nucleotides, to an oligonucleotide, or probe, to a polynucleotide, gene, chromosome fragment to entire chromosomes and genomes. For instance, a single- or double-stranded nucleic acid may be at least 10-, 20-, 30-, 40-, 50-, 60-, 70-, 80-, 90, or 100-nucleotides or base pairs (bp) in length. Larger still, a nucleic acid may be at least 0.2 kb, 0.3 kb, 0.4 kb, 0.5 kb, 0.6 kb, 0.7 kb, 0.8 kb, 0.9 kb, or 1.0 kb in size. Indeed, a nucleic acid for use in the present invention can be at least 1 kb, 2 kb, 3 kb, 4 kb, 5 kb, 6 kb, 7 kb, 8 kb, 9 kb, or 10 kb or larger in size. One preferred size range is 1-2 kb. The nucleic acid can be a chain of varying length of nucleotides and are typically called polynucleotides or oligonucleotides. An oligonucleotide is an oligomer generally resulting from a linear sequences of nucleotides. The oligonucleotide can comprise, for example, about 2 to about 100, about 2 to about 20, about 10 to about 90, or about 15 to about 35 nucleotides. In oligonucleotide arrays, about 25-mer oligonucleotides can be used. Another particular range is about 60- to about 80-mers, which are relatively long oligonucleotides.

Microarray methods, including selection of nucleic acid, probling, labeling, and detection, are described in U.S. Pat. Nos. 6,379,932 and 6,410,231 (Incyte Genomics) and can be used. These patents are incorporated by reference in their entirety. Although these references mention dip pen nanolithographic methods, they do not suggest how or provide guidance on how dip pen nanolithographic methods can be used to make improved nanoarrays as described herein.

A compound comprising a single nucleotide can also be used as ink. Mixtures of nucleic acids can be used, and different spots on an array can comprise different nucleic acids.

A nucleic acid for deposition may be formulated or mixed with other elements prior to, or after direct write deposition onto a substrate surface. Thus, an "ink" of the present invention may comprise other chemicals, compounds, or compositions for deposition onto a substrate surface in addition to a desired nucleic acid sample. As described above, solvent and salt can be used to apply the nucleic acid to the tips. Surfactants can be used. For instance, proteins, polypeptides, and peptides may be deposited along with a desired nucleic acid onto a substrate surface. Nucleic acid arrays, and the types of nucleic acids used therein, are described for example in *A Primer of Genome Science*, G. Gibson and S. Muse, 2002, Chapters 3-4 (pages 123-181), which is hereby incorporated by reference. This reference, for example, describes both cDNA microarrays and oligonucleotide arrays, labeling, hybridization, and statistical analysis. cDNA arrays can be used for monitoring the relative levels of expression of thousands of genes simultaneously. PCR-amplified cDNA fragments (ESTs) can be spotted and probed against fluorescently or radioactively labeled cDNA. The intensity of the signal observed can be assumed to be in proportion to the amount of transcript present in the RNA population being studied. Differences in intensity reflect differences in transcript level between treatments. Statistical and bioinformatic analyses can then be performed, usually with the goal of generating hypotheses that may be tested with established molecular biological approaches. Current cDNA microarrays, however, can have an upper limit of 15,000 elements and are unable to represent the complete set of genes present in higher eukaryotic genomes. The advantages and disadvantages of oligonucleotide versus cDNA microarrays are described in the aforementioned *A Primer of Genome Science* and can be used in constructing nucleic acid nanoarrays as described herein.

Oligonucleotides are also described in the working examples hereinbelow including labeled oligonucleotides and fluorolabeled oligonucleotides.

Patterning Composition—Solvent

The patterning composition can comprise one or more solvents. The solvent can be for example water including pure water, distilled water, deionized water, and the like. It can be a buffered solvent. The pH can be varied for the application. The solvent can be one or more organic solvents. Mixtures of solvent compounds can be used. Examples include alcohols, ethers, alkanes, esters, aromatics, as known in the art.

Patterning Composition—Amounts

The patterning composition can be formulated to allow for successful deposition. For example, the weight ratio of the lipid and the patterning species can be adapted. For example, the weight ratio can be about 10:1 to about 1:10, or about 9:1 to about 1:9, or about 8:1 to about 1:8, or about 7:1 to about 1:7, or about 6:1 to about 1:6, or about 5:1 to about 1:5, or about 4:1 to about 1:4, or about 3:1 to about 1:3, or about 2:1 to about 1:2, or about 1.5:1 to about 1:1.5. In some cases, about equal amounts (1:1) of the patterning compound to patterning species can be used by weight.

The components can be co-dissolved in a single solvent system, or the components can be separately dissolved and then the separate solutions mixed together. For example, concentration in solvent can be for example at least about 0.01 g/L, or at least about 0.1 g/L, or at least about 1 g/L. The concentration can be about 25 g/L or less, or about 10 g/L or less.

Concentration can be adapted to account for the phase behavior of the component including liquid crystalline phases and self-assembly and liposome formation. Temperature can be controlled to control phase state.

Tips and Instrumentation

Instrumentation to execute patterning by transferring materials from tip to substrate surface are known in the art. See for example products from NanoInk, Inc. (Skokie, Ill.). See also for example U.S. Pat. Nos. 6,827,979; 6,642,129; 6,867,443; 7,008,769; 6,573,369; and 6,998,228. For example, the tip can be a nanoscopic tip. The tip for example can be a scanning probe microscope tip or an atomic force microscope tip. The tip can be a solid tip; or the tip can be a hollow tip. The hollow tip can comprise an aperature and can delivery flow paths for delivering ink compositions to the end of the tip. The tip can comprise, for example, an inorganic surface or an organic surface. Tips can be made from hard materials through, for example, microfabrication. Sharpening of tips can be carried out.

After tip fabrication, the tip can be used as is, although the tip can be cleaned first when used as is. The tip can be also surface modified if desired after fabrication. For example, an organic coating can be added to an inorganic tip surface.

The tip can comprise a tip surface, including an inorganic tip surface, which has not been modified by organic material.

Tips can be made from materials known in the AFM arts including silicon nitride, silicon, and other hard materials.

The tip can be disposed on a cantilever, as known in the art, including at an end of a cantilever or near the end of a cantilever.

The tips can be if desired relatively long tips having for example a length of at least 5 microns, or at least 10 microns.

The tip can be part of an array of tips, so that a plurality of tips can be provided. For moving in the z-direction with respect to the surface, the tips can move together in a passive mode or can be moved individually in an active or actuated mode. Hence, in the depositing step, the tip can be passively used, or can be used as an actuated tip. The actuation mechanism can be for example thermal or electrostatic or piezoresistive. One-dimensional array of tips can be used; or two-dimensional array of tips can be used. In particular, arrays can be used which have large numbers of tips. See for example U.S. patent application Ser. No. 11/690,738 filed Mar. 23, 2007 to Mirkin et al., which is hereby incorporated by reference in its entirety including the Lenhart *Small* paper cited below in reference listing as no. 4. In this application, deposition of lipids and phospholipids is described.

Instrumentation methods are known in the art to move tips, and tips disposed on cantilevers, in the x, y, and z-directions with respect to the surface.

Instrumentation can be adapted to allow for heating of tips. See for example US Patent Publication No. 2006/0242740 to Sheehan et al.

Substrate and Substrate Surface

A wide variety of substrates can be used which present surfaces for deposition. Substrates can be those used to prepare microarrays in the art. Substrates can be polymeric, glass, ceramic, composite, metal, semiconductor, oxides, silicon, and the like. The substrate can be monolithic, one piece, or can comprise layers disposed on each other. The substrate can comprise an inorganic or an organic surface coating. A monolayer coating can be used. The surface can be functionalized with organic functional groups or organic material. For example, the substrate can comprise an inorganic material surface modified with an organic material.

The substrate surface can be adapted to covalently bond to or chemisorb to one or more components of the patterning composition. For example, the substrate surface can be an electrophilic surface. The substrate surface can be adapted to be reactive with functional groups in the patterning species. For example, amino groups in a protein can react with succinimide. Or a thiol group or compound can chemisorb to gold.

If fluorescent detection is used, the substrate and patterning can be adapted to minimize or avoid quenching of the fluorescence.

Substrates can be pre-patterned as needed to provide boundaries for and designate spaces for the deposition zones.

Depositing Step

The tip and the substrate surface can be moved with respect to each other so that a deposition of the patterning composition occurs and material is transferred from the tip to the surface to form a deposit. In some cases, a meniscus may be present to facilitate deposition. The tip the tip is in position for deposition can be controlled as desired.

In some cases, heat can be used to encourage deposition. Tips and cantilevers supporting tips can be heated, or the environment around the deposition area can be heated. An environmental chamber can be used to control humidity, temperature, atmospheric gases, and other parameters. For example, the deposition can be carried out at a relative humidity sufficient, e.g., sufficiently high, to allow the deposition to occur. In some cases, higher relative humidity may activate or speed up deposition. The deposition can be carried out at a relative humidity of for example at least 30%, or at least 50%, or at least 70%.

If the lipid exhibits a gel-liquid crystal transition temperature, the deposition temperature can be above this temperature, e.g., 10° C. or more above the gel-liquid crystal transition temperature.

The deposition step can be carried out by contacting the tip with the surface, wherein the tip is held stationary in the xy plane with respect to the surface. Alternatively, the deposition step can be carried out by contacting the tip with the surface, wherein the tip is not held stationary in the xy plane with respect to the surface, but rather the tip is moving.

If scanning probe instrumentation is used, such as AFM instrumentation, a variety of modes for use can be used including for example contact mode, noncontact mode, or tapping mode or intermittent contact mode.

Activation and Rate of Deposition

The lipid can activate or increase the rate of deposition of the patterning species. For example, in some cases, the patterning species will not substantially leave the tip without the lipid, or the amount leaving the tip may be too small to detect, or take too long to be commercially useful. Detecting deposition can be carried out by for example fluorescence detection or scanning probe methods.

Deposit

The deposit can be formed in a variety of shapes and patterns. A pattern can be found in a single deposit, or in a series of separate deposits. The deposit can be for example a dot or a line. The line can be straight or curved. The deposit can be characterized by a line width or a dot diameter. For example, the dot diameter or the line width can be about 10 nm to about 20 microns, or about 50 nm to about 10 microns, or about 100 nm to less than about one micron.

The deposit can be also characterized by a height. For example, the height can be about 1 nm to about 1 micron, or about 10 nm to about 750 nm, or about 100 nm to about 500 nm.

The distance between deposits can reflect high resolution and can be for example about 50 microns or less, or about 10 microns or less, or about 1 micron or less, or about 15 nm to about ten microns, or about 100 nm to about one micron. The distance between deposit can be measured as an edge-to-edge distance or a distance between center points (e.g., centers of dots).

The deposit can be treated by for example washing to remove one or more components including lipid, solvent, or both. The deposition and washing can be adapted so the patterning species is not removed. All or substantially all of the lipid can be removed, or if desired some lipid can be retained if washing is adapted accordingly.

Arrays

Also provided herein are articles including arrays, wherein the array comprises a substrate and one or more deposits disposed on the substrate surface. The deposits can be formed by methods described herein.

Applications

Applicants include microarrays and nanoarrays, including biological arrays, and the known applications of such arrays. For example, the development of direct patterning and nanopatterning methods for protein-based nanostructures is important for researchers working in the areas of proteomics, and theranostics. Such methods would allow one to generate multi-component biological nanostructures of proteins, oligonucleotides and viruses. Other applications include the development of biological microarrays and nanoarrays for high-throughput genomic and proteomic analysis, exploring biomolecular interactions on the nanoscale with larger biological entities (i.e. eukaryotic cells, viruses, bacteria and spores), and for biosensing and medical diagnostics.

WORKING EXAMPLES

A series of non-limiting working examples are also provided.

The patterning of a variety of biological molecules (i.e. oligonucleotides and proteins) was patterned on surfaces through the use dip-pen nanolithography and a novel biocompatible phospholipid matrix. The matrix comprises an aqueous solution of 1,2-di-oleoyl-sn-glycero-3-phosphocholine (DOPC) in an equal volume ratio, usually 1:1, with the desired biomolecule to be patterned in buffer.

Figure 2:
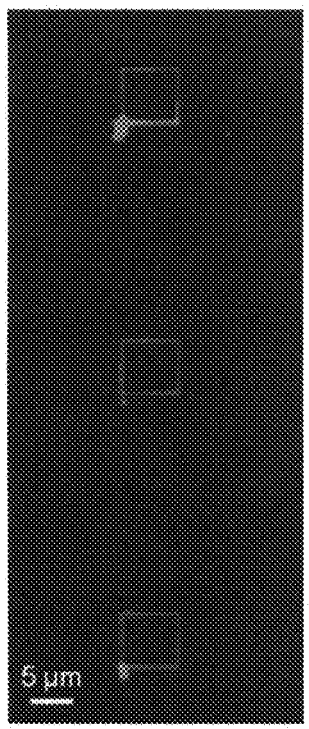
FIG. 2: Deposition of fluorophore-labeled amino terminated DNA onto a glass surface through the use of a DOPC phospholipid matrix. Fluorescence image captured through the red channel (Alexa 597).

In a first example, using DOPC as a matrix for the delivery of oligonucleotides onto gold surfaces was carried out. In order to characterize the resulting patterns, a 5'fluorophore-labeled oligonucleotide, with a 3' thiol terminal group, was used. The fluorophore-labeled thiolated DNA was dissolved in pure water (at a concentration of 1 g/L). This solution was then mixed with an equal volume of solution of DOPC dissolved in pure water (at a concentration of 10 g/L) and used as an ink for DPN as previously described (4). Fluorescent micrographs were then taken after the pattern was made (FIG. 1). Only the thicker patterns, in this case, showed fluorescence due to quenching by the gold surface of the thinner patterns. Smaller features were also generated through this approach (FIG. 2). In this case, instead of patterning large rectangular features on a gold surface, nanoscale line features were generated on pre-modified glass slides (commercially available glass slides functionalized with a succinimide polymer, which is used to capture amino terminated functional groups). The use of glass is advantageous for characterization, because one observed minimal quenching effects compared to that of gold surfaces). The oligonucleotides used in these experiments were, 5' Fluorophore-labeled (Alexa 597) and 3' amino terminated. The DNA to lipid ratio was approximately 1:1 by mass. Line widths below 500 nm (approximately 320 nm in thickness) were clearly observed, as determined by using fluorescence microscopy (FIG. 2). The fluorescent patterns were still visible after sonication for 10 minutes in water, followed by sonication for 10 minutes in ethanol, suggesting that the carrier can be removed while the amine-terminated DNA remains covalently attached to the succinimide functionalized glass.

Figure 3:
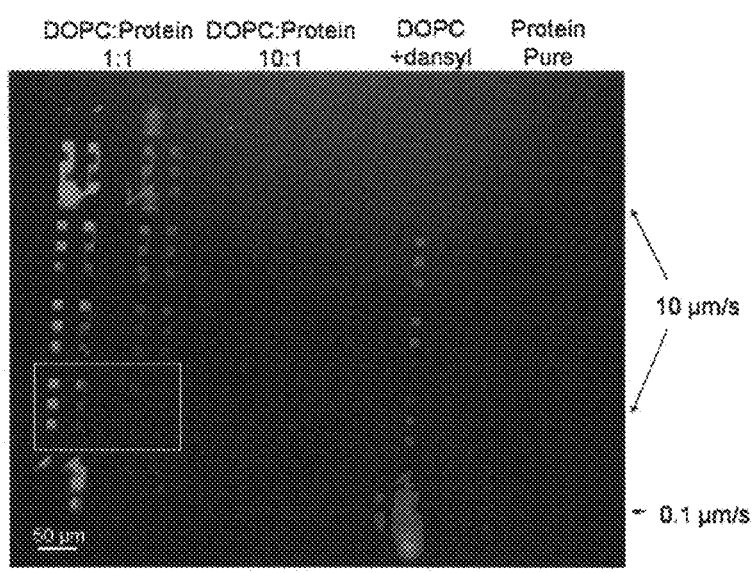
FIG. 3: Deposition of 2 fluorophore-labeled proteins on a glass surface through the use parallel DPN and DOPC as a phospholipid matrix. Fluorescence overlay image of the red, green and blue channels. Through the use of ink wells, multiple patterning conditions could be explored simultaneously (e.g., compared protein deposition with and without DOPC).
Figure 4:
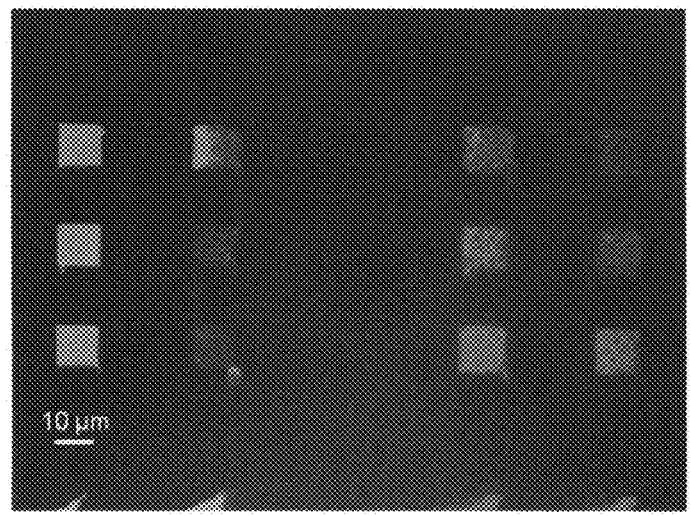
FIG. 4: High resolution fluorescence image of a patterned substrate that has been extensively washed, to remove the DOPC matrix. As seen in the image, the proteins are clearly retained on the surface. Fluorescence overlay image of the red and green channels.

To further demonstrate that DOPC phospholipids can be used as a universal ink carrier to assist DPN printing, the matrix-assisted deposition of multiple proteins in parallel (using parallel DPN) was explored. For these experiments, two different fluorophore-labeled proteins, cholera toxin subunit B (Alexa 596: red channel) and trypsin inhibitor (Alexa 488: green channel) were utilized. DOPC was mixed with these proteins (1 g/L) at two different ratios (1:1 and 10:1). In order to ink the parallel multi-tip array, inkwells were used, wherein different inking conditions could be explored simultaneously on the same chip with the same cantilever arrays (4). The tip-ink well contact time was approximately 30 minutes at relative moderate humidity (37%) and the substrates, glass pre-modified, that were used for these experiments were the same as the ones used for the oligonucleotides, described above. The simultaneous deposition of both proteins was clearly observed when a 1:1 ratio of DOPC to protein was used (FIG. 3, far left two columns). When a higher ratio of DOPC to protein was used (10:1), the ability to deposit these proteins was significantly impaired. As a control, it was tried to pattern the pure proteins without the DOPC phospholipid matrix, and as seen in the fluorescent micrograph image, they could not be patterned under the same conditions (FIG. 3, far right two columns). To determine if one could retain the proteins after washing away the phospholipid matrix (after sonication for 10 minutes in water), the square-like patterns from FIG. 3 were imaged and there was no loss of protein from the patterned areas, which is indicative of the retained covalent linkage of the proteins to the substrate (FIG. 4).

An NSCRIPTOR™, available from NanoInk, Inc. (Skokie, Ill.) was used for lithography. A linear array of 26 pens (F-26) was used from NanoInk. Inkwells were also obtained from NanoInk.

Reference Listing:
1. Miller, U. R. and Nicolau, D. V. (2005) *Microarray Technology and Its Applications*. Springer, New York.
2. Piner et al., (1999) *Science*, 283, 661-663.

3. Rosi, N. L. and Mirkin, C. A. (2005) Nanostructures *Chemical Reviews,* 105, 1547-1562.
4. Lenhert, S. et al. (2007) *Small,* 3, 71-75.

What is claimed is:

1. A method comprising:
providing a tip and a substrate surface, wherein the tip is a nanoscopic tip,
disposing a patterning composition at the end of the tip,
contacting the tip with the substrate surface, thereby depositing at least some of the patterning composition from the tip to the substrate surface to form a deposit disposed on the substrate surface,
wherein the patterning composition comprises at least one lipid, optionally at least one solvent, and at least one patterning species different from the lipid and the optional solvent, and
wherein the lipid dominates the rate of deposition of the patterning species, and
further comprising the step of washing the deposit to remove lipid from the deposit, wherein the patterning species remains in the deposit.

2. The method according to claim 1, wherein the tip is a scanning probe microscope tip.

3. The method according to claim 1, wherein the tip is an atomic force microscope tip.

4. The method according to claim 1, wherein the tip is a solid tip.

5. The method according to claim 1, wherein the tip is a hollow tip.

6. The method according to claim 1, wherein the tip comprises a surface which has not been modified by an organic material.

7. The method according to claim 1, wherein the tip comprises an inorganic surface which has not been modified by an organic material.

8. The method according to claim 1, wherein the tip is on a cantilever.

9. The method according to claim 1, wherein a plurality of tips is provided.

10. The method according to claim 1, wherein a plurality of tips are provided in a one dimensional array of tips.

11. The method according to claim 1, wherein a plurality of tips are provided in a two dimensional array of tips.

12. The method according to claim 1, wherein in the depositing step the tip is passively used.

13. The method according to claim 1, wherein in the depositing step the tip is used as an actuated tip.

14. The method according to claim 1, wherein the substrate surface is adapted to covalently bond to or chemisorb to one or more components of the patterning composition.

15. The method according to claim 1, wherein the substrate surface is an electrophilic surface.

16. he method according to claim 1, wherein the substrate surface is reactive with amino groups.

17. The method according to claim 1, wherein the substrate surface is adapted to chemisorb to a thiol compound.

18. The method according to claim 1, wherein the substrate surface comprises organic material.

19. The method according to claim 1, wherein the substrate comprises an inorganic material surface modified with an organic material.

20. The method according to claim 1, comprising a drying step wherein the patterning composition is subjected to drying on the tip.

21. The method according to claim 1, wherein the deposition is carried out at a relative humidity sufficiently high to allow the deposition to occur.

22. The method according to claim 1, wherein the deposition is carried out at a relative humidity of at least 30%.

23. The method according to claim 1, wherein the deposition is carried out at a relative humidity of at least 50%.

24. The method according to claim 1, wherein the depositing is carried out by contacting the tip with the surface, wherein the tip is held stationary in the XY plane with respect to the surface.

25. The method according to claim 1, wherein the depositing is carried out by contacting the tip with the surface, wherein the tip is moved in the XY plane with respect to the surface.

26. The method according to claim 1, wherein the deposit is a dot or a line.

27. The method according to claim 1, wherein the deposit has a dot diameter or a line width of at least about 10 nm and less than about 20 microns.

28. The method according to claim 1, wherein the deposit has a dot diameter or a line width of at least about 50 nm and less than about 10 microns.

29. The method according to claim 1, wherein the deposit has a dot diameter or a line width of at least about 100 nm and less than about 1 micron.

30. The method according to claim 1, wherein the lipid is a phospholipid.

31. The method according to claim 1, wherein the lipid is a simple lipid.

32. The method according to claim 1, wherein the lipid is a compound lipid.

33. The method according to claim 1, wherein the lipid is a derived lipid.

34. The method according to claim 1, wherein the lipid is a phosphoacylglycerol, a sphingomyelin, a cerebroside, or a ganglioside.

35. The method according to claim 1, wherein the lipid is a steroid, a carotenoid, or a lipid vitamin.

36. The method according to claim 1, wherein the lipid comprises unsaturated fatty acid.

37. The method according to claim 1, wherein the lipid is a lipid capable of self-assembling into a lipid bilayer.

38. The method according to claim 1, wherein the lipid is a phosphocholine lipid.

39. The method according to claim 1, wherein the lipid is DOPC.

40. The method according to claim 1, wherein the patterning species is a biomolecule.

41. The method according to claim 1, wherein the patterning species is a biopolymer.

42. The method according to claim 1, wherein the patterning species comprises polymerized nucleic acid or amino acids.

43. The method according to claim 1, wherein the patterning species is an oligonucleotide, DNA, RNA, protein, or peptide.

44. The method according to claim 1, wherein the patterning species has not been adapted synthetically for interaction with the substrate surface.

45. The method according to claim 1, wherein the patterning species has been adapted synthetically for interaction with the substrate surface.

46. The method according to claim 1, wherein the optional solvent is water.

47. The method according to claim 1, wherein the optional solvent is a buffered solvent.

48. The method according to claim 1, wherein the weight ratio of the lipid and the patterning species is adapted for deposition of the patterning species.

49. The method according to claim 1, wherein the weight ratio of the lipid and the patterning species is about 9:1 to about 1:9.

50. The method according to claim 1, wherein the weight ratio of the lipid and the patterning species is about 7:1 to about 1:7.

51. The method according to claim 1, wherein the weight ratio of the lipid and the patterning species is about 5:1 to about 1:5.

52. The method according to claim 1, wherein the weight ratio of the lipid and the patterning species is about 3:1 to about 1:3.

53. The method according to claim 1, wherein the weight ratio of the lipid and the patterning species is about 2:1 to about 1:2.

54. The method of claim 1, wherein the lipid is a phospholipid, and the patterning species comprises a protein or comprises a nucleic acid.

55. The method of claim 1, wherein the lipid is a phospholipid, and the patterning species is an oligonucleotide.

56. The method of claim 1, wherein the lipid is a phospholipid, and the patterning species is a protein.

57. A method comprising:
providing a nanoscopic tip and a substrate surface,
disposing a patterning composition at the end of the nanoscopic tip,
contacting the tip with a substrate surface, thereby depositing at least some of the patterning composition from the tip to the substrate surface to form a deposit disposed on the substrate surface,
wherein the patterning composition comprises at least one phospholipid, optionally at least one solvent, and at least one biooligomeric or biopolymeric patterning species different from the lipid and the optional solvent, and wherein the weight ratio of the lipid and the patterning species is adapted for deposition of the patterning species, and wherein the lipid dominates the rate of deposition of the patterning species further comprising the step of washing the deposit to remove lipid from the deposit, wherein the patterning species remains in the deposit.

58. A method comprising:
providing a tip and a substrate surface,
disposing a patterning composition at the end of the tip,
contacting the tip with a substrate surface, thereby depositing at least some of the patterning composition from the tip to the substrate surface to form a deposit disposed on the substrate surface,
wherein the patterning composition comprises at least one lipid, optionally at least one solvent, and at least one patterning species different from the lipid and the optional solvent, and wherein the lipid dominates the rate of deposition of the patterning species further comprising the step of washing the deposit to remove lipid from the deposit, wherein the patterning species remains in the deposit.

59. A method comprising:
providing an atomic force microscope tip and a substrate surface,
disposing a patterning composition at the end of the atomic force microscope tip,
contacting the atomic force microscope tip with a substrate surface, thereby depositing at least some of the patterning composition from the tip to the substrate surface to form a deposit disposed on the substrate surface,
wherein the patterning composition comprises at least one phospholipid and at least one biopolymer different from the phospholipid, and wherein the phospholipid dominates the rate of deposition of the biopolymer further comprising the step of washing the deposit to remove lipid from the deposit, wherein the patterning species remains in the deposit.

60. A method comprising:
providing a first tip, a second tip, and a substrate surface, wherein the first tip and the second tip are each a nanoscopic tip;
disposing a first patterning composition at the end of the first tip and a second patterning composition at the end of the second tip, wherein the first patterning composition comprises at least one lipid, optionally at least one solvent, and at least one patterning species different from the lipid and the optional solvent, and wherein the second patterning composition comprises the lipid, optionally the solvent, and at least one second patterning species different from the lipid, the optional solvent and the first patterning species;
contacting the first tip and the second tip with the substrate surface, thereby simultaneously depositing at a controlled rate at least some of the first patterning composition and the second patterning composition to the substrate surface to each form a deposit disposed on the substrate surface, wherein the lipid dominates the rate of deposition of the first patterning species and the second patterning species; and
further comprising the step of washing the deposit to remove the lipid from the deposit, wherein the first patterning species and the second patterning species remains in the deposit.

61. The method according to claim 60, wherein in absence of the lipid the first patterning species and the second patterning species have different rates of deposition from the first tip and the second tip to the substrate surface, and wherein in the present of the lipid the first patterning species and the second patterning species have approximately equivalent rates of deposition from the first tip and the second tip to the substrate surface.

* * * * *